UNITED STATES PATENT OFFICE.

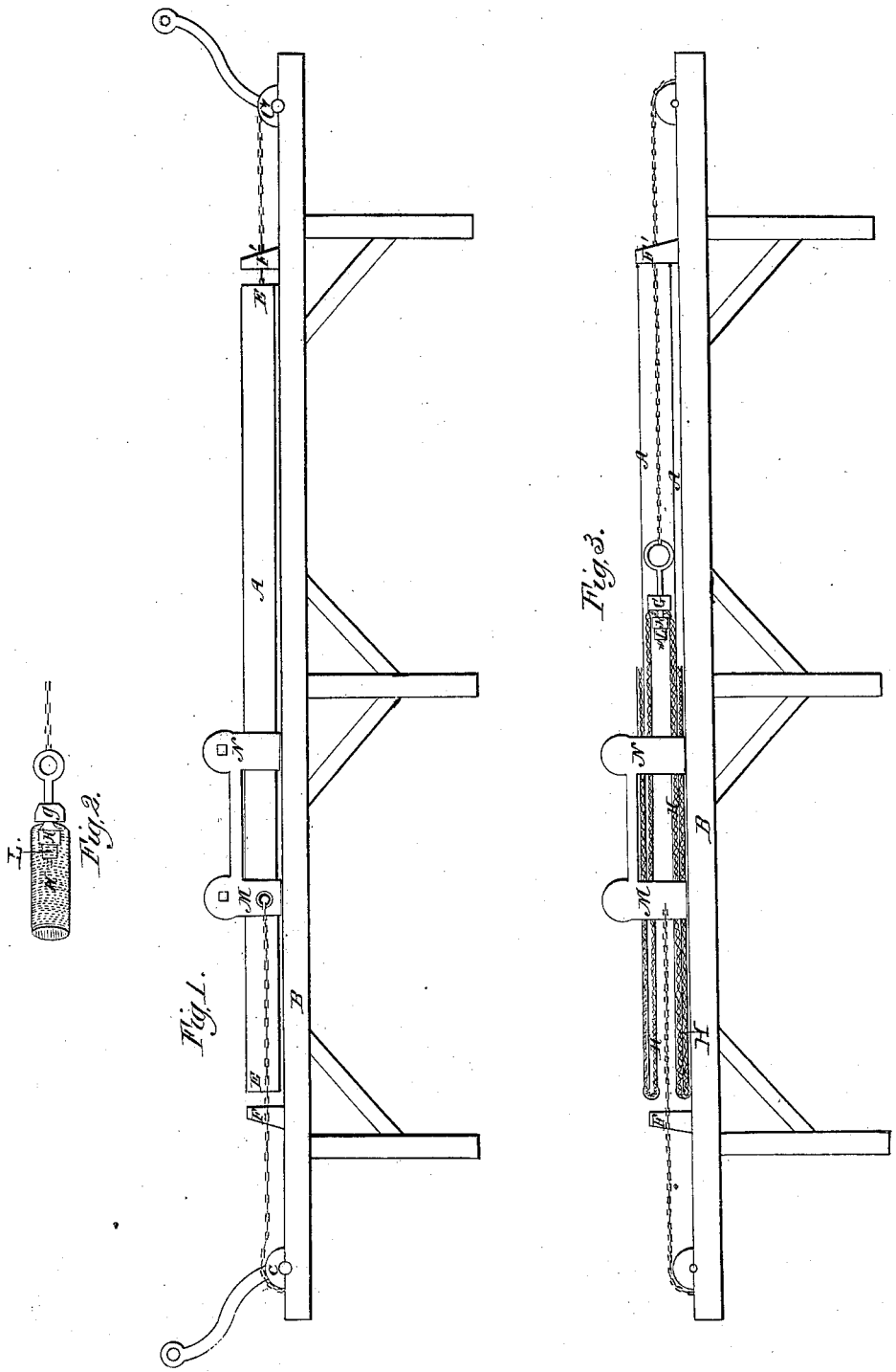

CHARLES H. HINCKLEY, OF STONINGTON, CONNECTICUT.

COATING HOSE-PIPE.

Specification forming part of Letters Patent No. 18,281, dated September 29, 1857; Reissued June 5, 1860, No. 969.

*To all whom it may concern:*

Be it known that I, CHARLES H. HINCKLEY, of Stonington, New London county, and State of Connecticut, have invented a new and useful Improvement in the Manufacture of Hose-Pipe, and that the following is a full and exact description thereof, reference being had to the accompanying drawings, making part of this specification.

The principle of my invention consists in a peculiar mode of applying a coating of vulcanized india rubber to the inside of a hose pipe formed from fibrous materials. For this purpose I prepare the pipe by having it woven in shape, from strong hemp cord or twine, or other suitable material, and apply to the outer surface thereof, firmly, a thin coating of vulcanized india rubber by any of the known methods. I then proceed to turn the pipe so as to bring the coating of india rubber within, as follows, viz: I prepare a copper or brass pipe A, Figure 1, of a size such as will just pass within the canvas pipe, and of a length equal to the greatest length of pipe to be turned. The ends of the metal pipe should be wired or turned over so as to present a smooth and easy passage from the outer to the inner surface. Fig. 3 is a vertical section showing the position of the hose pipe during its transformation while passing on and through the metal pipe. This metallic pipe is placed on a table or bench B, a little longer than itself, at each end of which is a windlass C and C'. The canvas pipe is first drawn on over the metal pipe from the end E', by connecting its end to the chain of the windlass C, and turning the windlass while the end E of the pipe bears against the brace F, fastened to the bench: When this is accomplished, a chain from the windlass C' is passed through the pipe, and connected by a clasp Figs. 2 and 3 to the end of the canvas pipe H which is turned or folded in between the flange *g* and follower or grip K, when the nut L is screwed up and holds it firmly. The winch C' is then turned so as to draw the clasp, and with it the end of the canvas pipe or hose within and through the interior of the metal pipe; while the winch C is also applied to draw or force the hose on the outside toward the entering end E, by means of its attachment to clasps M, N, which may be made to clasp the hose pipe with any required degree of force, and may be changed from one position thereon to another, as may be required by the advance of the pipe thereon; the metal pipe during this latter action presses against, and is held by the brace F'. The action being continued according to this arrangement, the hose is drawn wholly through the metal pipe, and is turned so that the coating of india rubber which was on the outside is now within; and the hose is now completed and ready to receive the proper couplings for connecting the joints. In this manner from 50 to 100 feet in length can be turned in one piece.

The metallic pipe used in turning the hose pipe should be smooth, and free from obstructions at the joints or connections of the different pieces of which it is composed; and it may be lubricated if necessary, in order to reduce the friction of the hose pipe in passing on and through.

I am aware that hose pipe has been formed from cloth coated with india rubber within, and wound so as to form several thicknesses of the cloth each thickness either coated with rubber, or the different folds or thickness connected by cement, composed of a solution of rubber; but strong objections are urged against the pipe thus made: chiefly on account of the rotting qualities imparted to the cloth, by means of the sweating occasioned by the rubber and cement with which it is incorporated, and within which it is confined; but by the method adopted by me, no such objection can exist: for the cloth being a close and very strong canvas case, without seam, is wholly on the outside of the rubber coating and is perfectly ventilated, which secures it perfectly from the sweating and rotting effects experienced in the former method, and by coating the hose pipe with the rubber first on the outside and then turning it inwardly after being secured firmly to the cloth by being vulcanized, or otherwise, it will be perfectly impervious to water, and if the pipe is woven of sufficient strength as it may be, it is believed it will be as efficient and even more durable than leather hose. The pipe may be of any size from the largest size in use to the smallest practicable size.

What I claim as my invention and for which I solicit Letters Patent is—

The above process of constructing pipe of textile and fibrous material within an internal coating of vulcanized india rubber, viz by first applying the india rubber coating on the outside and afterward inserting the same by drawing it over and through a metallic cylinder.

CHARLES H. HINCKLEY.

Witnesses:
N. SCHOLFIELD,
H. M. SCHOLFIELD.

[FIRST PRINTED 1912.]